United States Patent
Etkin et al.

(10) Patent No.: US 9,692,616 B1
(45) Date of Patent: Jun. 27, 2017

(54) APPARATUS FOR AND METHOD OF CHANNEL ESTIMATION BUFFER COMPRESSION VIA DECIMATION, PREDICTION, AND ERROR ENCODING

(71) Applicant: Samsung Electronics Co., Ltd., Gyeonggi-do (KR)

(72) Inventors: Raul H Etkin, Sunnyvale, CA (US); Bhaskar Nallapureddy, San Jose, CA (US); Jungwon Lee, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/010,486

(22) Filed: Jan. 29, 2016

Related U.S. Application Data

(60) Provisional application No. 62/262,072, filed on Dec. 2, 2015.

(51) Int. Cl.
*H04L 27/06* (2006.01)
*H04L 25/02* (2006.01)

(52) U.S. Cl.
CPC ................. *H04L 25/0202* (2013.01)

(58) Field of Classification Search
CPC . H04L 25/067; H04L 1/0045; H04L 27/2647; H04L 1/005; H04L 1/0054; H04L 1/20; H04N 5/4401; H04B 1/30; H04B 1/28
USPC .................. 375/340, 316, 295, 219
See application file for complete search history.

(56) References Cited

U.S. PATENT DOCUMENTS

| | | | |
|---|---|---|---|
| 4,882,754 A | 11/1989 | Weaver et al. | |
| 7,428,262 B2 | 9/2008 | Zancho et al. | |
| 7,889,706 B2 | 2/2011 | Ong et al. | |
| 8,644,264 B2 | 2/2014 | Coralli et al. | |
| 8,644,330 B2 | 2/2014 | Lomnitz et al. | |
| 8,687,497 B2 | 4/2014 | Sands et al. | |
| 8,780,686 B2 | 7/2014 | Sands et al. | |
| 9,088,350 B2 | 7/2015 | Pereira | |

(Continued)

FOREIGN PATENT DOCUMENTS

| | | |
|---|---|---|
| WO | WO 0062501 | 10/2000 |
| WO | WO 2014/180510 | * 11/2014 |

OTHER PUBLICATIONS

Lee, Pei-Jun et al., Decoder Picture Buffer Reduction based Effective Reference Frame Selection algorithm for Multiview Video Coding Visual Communications and Image Processing (VCIP), 2011 IEEE Date of Conference: Nov. 6-9, 2011, Nov. 9, 2011, pp. 1-4 1-4 77-1321-7 INSPEC, E-ISBN : 978-1-4577-1320-0 Print ISBN: 978-1-4577-132-7 INSPEC Accession No. 12493712 Conference Location : Tainan DOI: 10.1109/VCIP.2011.6115998 Publisher: IEEE.

*Primary Examiner* — Zewdu Kassa
(74) *Attorney, Agent, or Firm* — The Farrell Law Firm, P.C.

(57) ABSTRACT

An apparatus and a method are provided. The apparatus includes a receiver configured to receive a signal over channels, a channel estimator configured to estimate the channels as first channel estimates; and a processor configured to compress the channel estimates to reduce buffer size. The method includes receiving a signal over channels by a receiver, estimating, by a channel estimator, the channels as a first channel estimate; and compressing, by a processor, the channel estimates to reduce buffer size.

18 Claims, 5 Drawing Sheets

(56) References Cited

U.S. PATENT DOCUMENTS

| | | |
|---|---|---|
| 9,113,846 B2 | 8/2015 | Zinaty et al. |
| 2010/0002791 A1* | 1/2010 | Noh .................... H04L 25/0202 375/260 |

* cited by examiner

| 0 | 1 | 2 | 3 | 4 | 5 | 6 | 7 | 8 | 9 | 10 | 11 | —401

APPARATUS FOR AND METHOD OF CHANNEL ESTIMATION BUFFER COMPRESSION VIA DECIMATION, PREDICTION, AND ERROR ENCODING

PRIORITY

This application claims priority under 35 U.S.C. §119(e) to a U.S. Provisional Patent Application filed on Dec. 2, 2015 in the United States Patent and Trademark Office and assigned Ser. No. 62/262,072, the entire contents of which are incorporated herein by reference.

BACKGROUND OF THE DISCLOSURE

Field of the Disclosure

The present disclosure relates generally to an apparatus for and a method of channel estimation, and more particularly, to an apparatus for and a method of compressing channel estimates to reduce buffer size.

Description of the Related Art

A typical communication receiver using coherent detection has a channel estimation (CE) block that estimates various channel gains affecting a signal as it travels from a transmitter to a receiver. The coherent receiver uses CE for data demodulation. The channel estimates produced by this block are often stored in a CE output buffer to be used by other blocks (e.g. a symbol detector) in the receiver chain. The number of stored channel estimates increases as communication protocols require support for multiple antennas and modulation carriers, such as increased bandwidth (e.g. multiple frequency carriers) and increased number of transmit and receive antennas. This causes the CE output buffer size to increase and occupy a significant portion of an integrated circuit (IC).

SUMMARY

According to an aspect of the present disclosure, an apparatus is provided. The apparatus includes a receiver configured to receive a signal over channels; a channel estimator configured to estimate the channels as first channel estimates; and a processor configured to compress the channel estimates to reduce buffer size.

In accordance with another aspect of the present disclosure, a method is provided. The method includes receiving, by a receiver, a signal over channels; estimating, by a channel estimator, the channels as a first channel estimate; and compressing, by a processor, the channel estimates to reduce buffer size.

In accordance with another aspect of the present disclosure, a method is provided. The method includes receiving a signal over channels by a receiver; estimating the channels as first channel estimates by a processor; selecting a predetermined subset of the estimated channels as decimated channels by the processor; generating second channel estimates as predicted channel estimates of the first channel estimates by the processor using the decimated channels; computing channel estimation errors between the first channel estimates and the predicted channel estimates by the processor; compressing the channel estimation errors by the processor; buffering the decimated channel estimates and the compressed channel estimation errors by the processor; and computing the predicted channel estimates by the processor; approximating the first channel estimates by the processor using the predicted channel estimates and the compressed channel estimation errors.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
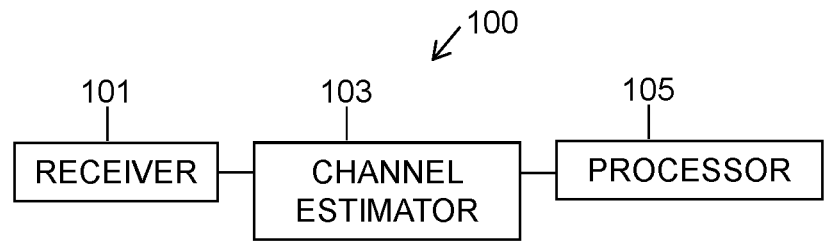
FIG. 1 is a block diagram of an apparatus for channel reception, channel estimation buffer compression via decimation, prediction, error compression, and estimated channel transmission according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of additional one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The channel estimates exhibit various forms of correlation, across frequency, time or space (antennas). These correlations can be exploited to reduce buffering requirements via data compression techniques.

A buffer for storing channel estimates takes up a significant portion of an integrated circuit (IC). This will increase as the number of component carriers (CCs) and antennas increase. However, channel estimates exhibit correlation over frequency and time, which may be used to reduce buffering requirements via a compression algorithm.

Data compression may be suitable for various applications, such as an audio file, an image file, a video file, a text file, and a database. Data compression techniques may be classified in various ways including, but not limited to, lossless vs. lossy, universal vs. non-universal, one dimensional (1D) video vs. two dimensional (2D) video, and online vs. offline.

Data compression codes and coding methods include Huffman coding, arithmetic coding, Lempel-Ziv, joint photographic experts group (JPEG), moving picture experts group audio layer 3 (MP3), and International Telecommunication Union (ITU) video compression standard H.264 (also known as moving picture experts group 4 (MPEG-4)). Data compression methods are applicable to different applications based on factors such as statistical properties of the data source to be compressed, compression performance, implementation complexity, reconstruction quality/distortion metrics, and causality.

Data compression of channel estimates have very specific requirements that limit the applicability of typical methods. While some distortion may be tolerated, the distortion metrics to be used (e.g. frame error rates) are different than those used in audio or video compression.

FIG. 1 is a block diagram of an apparatus 100 according to an embodiment of the present disclosure. The apparatus 100 compresses channel estimates to reduce buffer size. The apparatus 100 also compresses channel estimates produced by a channel estimation method, thus decoupling the roles of channel estimation and data compression. The apparatus 100 may be part of, but is not limited to, a long term evolution (LTE) system that uses orthogonal frequency-division multiplexing (OFDM). The apparatus 100 may apply to other communications systems and other multiple access methods.

Referring to FIG. 1, the apparatus 100 includes a receiver 101, a channel estimator 103, and a processor 105. The apparatus 100 provides low implementation complexity, no error propagation, random access for decompression, low distortion, and flexibility.

The receiver 101 receives a signal over channels. The channel estimator 103 estimates the channels as first channel estimates. The processor 105 compresses the channel estimates to reduce buffer size.

The channel estimator 103 estimates channels a first time (e.g. "first channel estimates"). According to an embodiment of the present disclosure, the first channel estimates obtained by the channel estimator 103 may be represented as, but are not limited to, a vector with complex entries $h_l[k]$ for $k=0, \ldots, K-1$, where k is a frequency subcarrier index and l is an OFDM symbol index. The set of first channel estimates is denoted in OFDM symbol l by $H_l$. The first channel estimates may be stored with a finite precision format (e.g. fixed point with a given bit-width), but is not limited thereto.

According to an embodiment of the present disclosure, channel estimates may be given as a vector over frequency subcarriers. In general, channel estimates may span several dimensions in addition to frequency, such as time (e.g. OFDM symbol index), and space (e.g. transmit and receive antennas).

Figure 2:
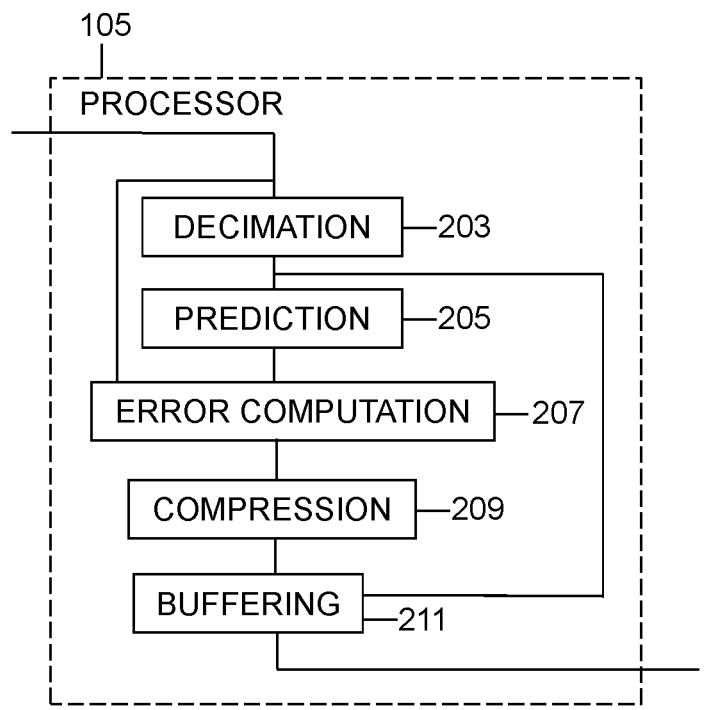
FIG. 2 is a block diagram of a processor of FIG. 1 according to an embodiment of the present disclosure.

FIG. 2 is a block diagram of the processor 105 of FIG. 1 according to an embodiment of the present disclosure.

Referring to FIG. 2 the processor 105 is configured to perform channel decimation 203, channel prediction 205, error computation 207, compression 209, and buffering 211. The processor 105 provides the low implementation complexity, no error propagation, random access for decompression, low distortion, and flexibility of apparatus 100 of FIG. 1.

Decimation 203 is conducted on to the result of channel estimation. Decimation 203 is accomplished by selecting a subset of the first channel estimates (e.g. "decimated channel estimates"). The decimated channel estimates may be based on a predetermined representation (e.g. fixed point with a given bit-width). For decimation 203, the choice of the decimated channel estimates, which will be used for prediction 205, enables the use of prediction methods with low implementation complexity while achieving small prediction error. In addition, the choice of decimated channel estimates allows random access during decompression, as described in more detail below with reference to FIG. 3.

Figures 4, 5:
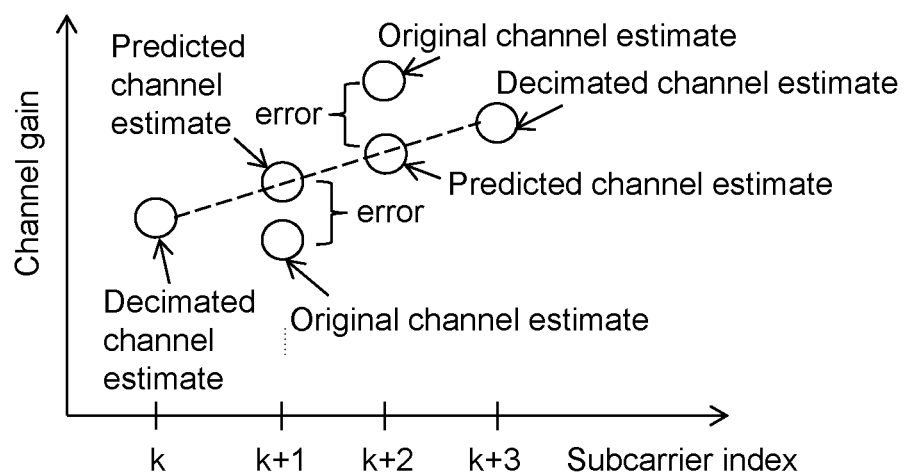
FIG. 4 is an illustration of a decimated channel according to an embodiment of the present disclosure.
FIG. 5 is an illustration of original channel estimates, decimated channel estimates, predicted channel estimates, and errors between original channel estimates and predicted channel estimates according to an embodiment of the present disclosure.

The subset selected by decimation 203 is represented in Equation (1) as follows:

$$H_l^D = \{h_l[n*DF]: n=0,1,\ldots,\lfloor(K-1)/DF\rfloor\} \cup \{h_l[K-DF+1],\ldots,h_l[K-1]\}, \quad (1)$$

where decimation factor DF is a constant, and allocation size K may be, but is not limited to, a multiple of DF. For example, if DF=2, decimation 203 is accomplished by selecting every other one of the first channel estimates produced by channel estimation, and selecting the last of the first channel estimates in the allocation at a subcarrier with index K-1, as illustrated in FIG. 4 and described below. The set $H_l^D$ is stored or buffered 211 as described below.

Decimation 203 may produce decimated channel estimates that are uniformly spaced or not uniformly spaced (e.g. non-uniformly spaced). In addition, the decimated channel estimates need not be selected at the end of an allocation to avoid extrapolation during prediction.

Prediction 205 is performed on the result of decimation 203. Prediction 205 generates second channel estimates (e.g. "predicted channel estimates") of the first channel estimates using the decimated channel estimates. Predictor 205 may be, but is not limited to, a linear interpolator or a minimum mean square error (MMSE) estimator.

In an embodiment of the present disclosure where prediction 205 provides linear interpolation as illustrated in FIG. 5 described below, predicted channel estimates are represented by Equation (2) as follows:

$$\hat{h}_l[k+d] = \left(1 - \frac{d}{DF}\right)h_l[k] + \frac{d}{DF}h_l[k+DF], \quad (2)$$
$$k = 0, DF, \ldots, DF * \lfloor (K-1)/DF \rfloor,$$

where d=1, 2, ..., DF−1, and where "$\lfloor x \rfloor$" is a floor function of x.

While the first channel estimates may be represented with a predetermined finite precision, the predicted channel estimates may be represented with higher precision than the first channel estimates, since they are not buffered 211 as described below.

Prediction 205 of FIG. 2 may use any suitable estimation method. For example, if second order statistics of the channel estimates are available, they may be used to derive MMSE estimates. Alternatively, instead of linear (e.g. $1^{st}$ order) interpolation, alternative embodiments may use $n^{th}$ order polynomial interpolation. If required, in addition to interpolation, other embodiments may use extrapolation in prediction 205.

Error computation 207 is performed on the results of channel estimation and prediction 205. Error computation 207 receives the first channel estimates and the predicted channel estimates and computes channel estimation errors that include the difference between the first channel estimates and the predicted channel estimates, but is not limited thereto.

Error computation 207 generates the difference between the first channel estimates and the predicted channel estimates according to Equation (3) as follows:

$$e_l[k+d] = h_l[k+d] - \hat{h}_l[k+d], \quad k=0, DF, \ldots, DF * \lfloor (K-1)/DF \rfloor, \quad (3)$$

where d=1, 2, ..., DF−1.

The set of errors may be denoted by $E_l$. These errors are buffered 211 as described below in a finite precision format, for example, fixed point representation with bit-width BitW. The errors may exceed the maximum representation range with bit-width BitW, in which case they may be rounded and saturated. Rounded and saturated errors are denoted by $\tilde{e}_l$, and the corresponding set $\tilde{E}_l$. After buffering 211 of the sets $H_l^D$ and $\tilde{E}_l$, compression is completed.

Since prediction 205 uses decimated channel estimates instead of reconstructed channel estimates, there is no error propagation. That is, if one predicted channel estimate includes an error, that error does not affect other predicted channel estimates. By varying the number of bits used to represent channel estimation errors, it is possible to trade off compression performance and decompression quality (rate-distortion tradeoff) as described in more detail below with reference to FIG. 3. This enables flexibility to suit various communication channels, modulation and coding rates, and signal propagation environments.

If prediction 205 generates predicted channel estimates for the first channel estimates not selected for the decimated channel estimates, the errors computed by error computation 207 are small and have smaller dynamic range as compared to the first channel estimates. As a result, the errors can be compressed using fewer bits for a given decompression approximation quality target as described in more detail below with reference to FIG. 3. This results in compression gains.

Compression 209 is performed on the results of error computation 207. Compression 209 compresses the channel estimation errors. Compression 209 may encode the channel estimation errors using a predetermined representation (e.g., fixed point with a given bit-width, quantization compression, lossless compression, or lossy compression), but is not limited thereto. In an embodiment of the present disclosure, channel estimation errors may be encoded in pseudo floating point (PFLP) format to obtain a larger dynamic range.

Buffering 211 is performed on the result of decimation 203 and compression 209. Buffering 211 stores the decimated channel estimates and the compressed channel estimation errors. As described in more detail below with reference to FIG. 3, the compressed channel estimation errors may be decompressed and used with the decimated channel estimates to approximate the first channel estimates.

In an embodiment of the present disclosure, the first channel estimates may be buffered with the same representation after decimation. In an embodiment of the present disclosure, the first channel estimates may be buffered with a different representation than after decimation 203 by varying the bit-width or changing fixed point for floating point, etc.

In addition, the compressed channel estimation errors may be buffered with a different representation (e.g. a different bit-width) depending on the prediction error statistics or distance with respect to the decimated channel estimates. They may also be buffered using floating point representation even in cases where the decimated channel estimates are stored in fixed point representation, or any other format.

Furthermore, block pseudo floating point (BPFLP) format may be used to represent decimated channel estimates and compressed channel estimation errors buffering 211 to cover a larger dynamic range. In this format, a common exponent is used for a block of decimated channel estimates or compressed channel estimation errors. The exponent may also be shared across real and imaginary parts of a complex number. In the BPFLP representation, exponent sharing in PFLP is extended to a block of resource elements (REs). For example, a block may be a group of consecutive REs in the frequency domain within an OFDM symbol, in which case the block size B is defined as the number of consecutive REs in the frequency domain. The performance of BPFLP may be good as long as B is smaller than the coherence bandwidth of the channel. For slow fading channels, the block can also include REs of nearby OFDM symbols.

Figure 3:
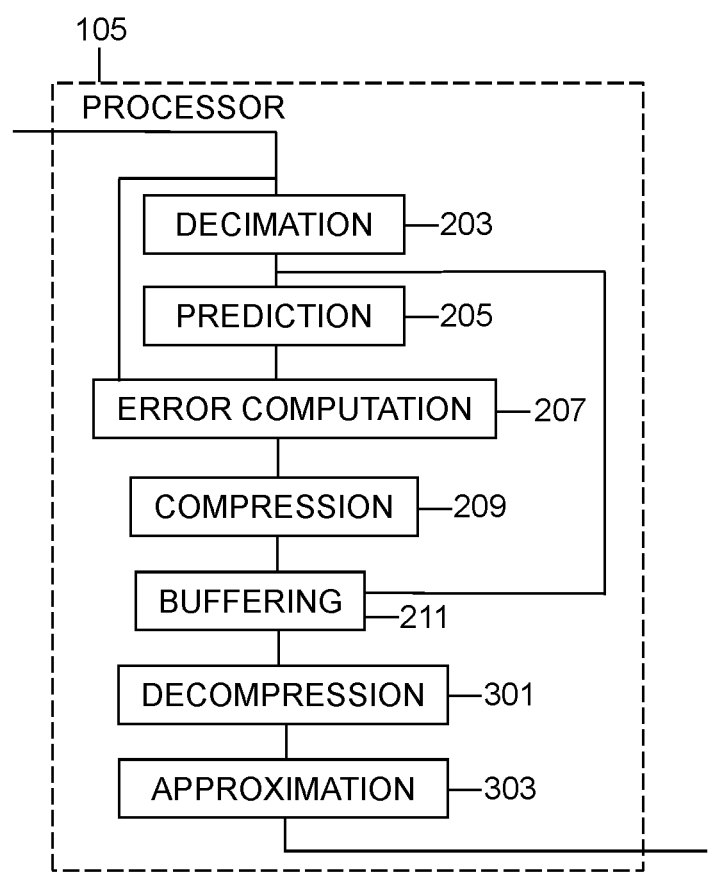
FIG. 3 is a block diagram of a processor of FIG. 1 according to an embodiment of the present disclosure.

FIG. 3 is a block diagram of a processor 105 of FIG. 1 according to an embodiment of the present disclosure. The processor 105 of FIG. 3 includes all of the operations of FIG. 2 plus decompression 301 and approximation 303. The operations in FIG. 3 that are in common with the operations in FIG. 2 operate in the same manner. Thus, descriptions of the operations in FIG. 3 that are in common with operations in FIG. 2 are not repeated below.

Referring to FIG. 3, the decompression 301 is performed on the buffering 211 decimated channel estimates and compressed channel estimation errors concerning a set of first channel estimates. Decompression 301 uses the decimated channel estimates to compute the predicted channel estimates according to Equation (2) above.

Approximation 303 is performed on the result of decompression 301. Approximation 303 uses the predicted channel estimates generated by decompression 301 with the compressed channel estimation errors $\tilde{E}_l$ to approximate the first channel estimates according to Equation (4) as follows:

$$\tilde{h}_l[k+d] = \hat{h}_l[k+d] + \tilde{e}_l[k+d], \; k=0, DF, \ldots, DF*\lfloor(K-1)/DF\rfloor, \quad (4)$$

where $d=1, 2, \ldots, DF-1$.

The result of approximation 303 includes the approximate channel estimates and the decimated channel estimates $H_l^D$. However, $\tilde{h}_l[k]$ may differ from $h_l[k]$ due to rounding and saturation of the errors prior to buffering 211. Distortion and compression performance may be traded off by varying the bit-width BitW.

FIG. 4 is an illustration of a decimated channel 401 according to an embodiment of the present disclosure. In FIG. 4, DF=2 and K=12.

Referring to FIG. 4, each box represents a first channel estimate (e.g. 0 to 11). The boxes that include an underline are selected by way of decimation 203 in FIG. 2 or 3.

FIG. 5 is an illustration of first channel estimates, decimated channel estimates, predicted channel estimates, and errors between first channel estimates and predicted channel estimates according to an embodiment of the present disclosure.

Referring to FIG. 5, linear prediction based on decimated channel estimates is illustrated, where DF=3.

Figure 6:
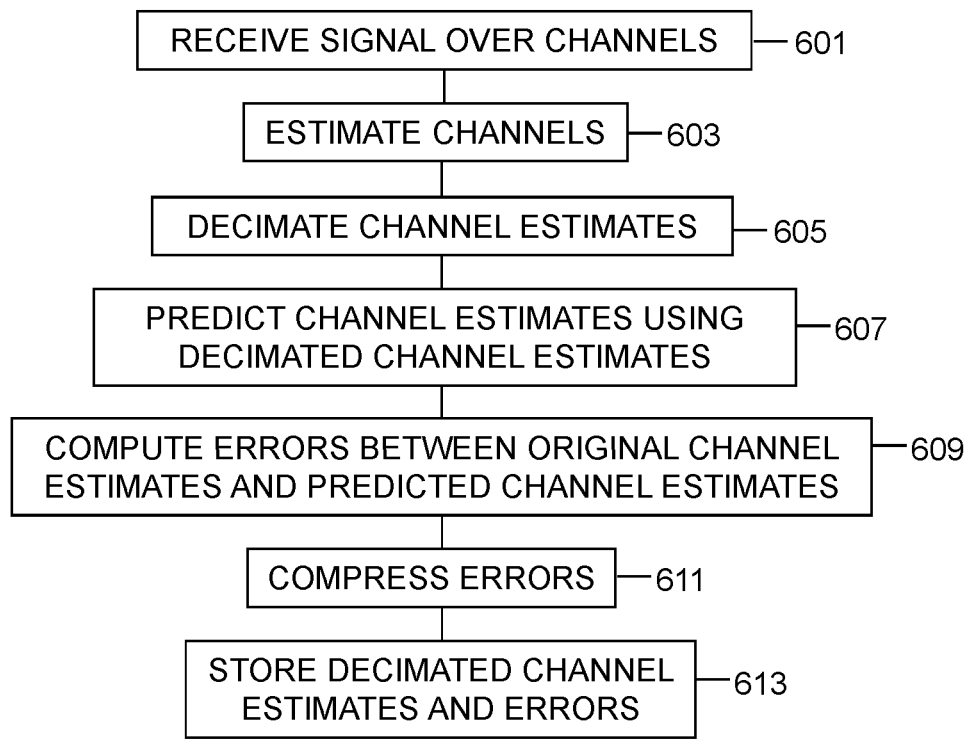
FIG. 6 is a flowchart of a method of receiving a signal over channels, reducing buffer requirements for storing decimated channel estimates and compressed channel estimation errors according to an embodiment of the present disclosure.

FIG. 6 is a flowchart of a method of receiving a signal over channels, reducing buffer requirements for storing decimated channel estimates and compressed channel estimation errors according to an embodiment of the present disclosure. The method compresses channel estimates to reduce buffer size. The method also compresses channel estimates produced by a channel estimation method, thus decoupling the roles of channel estimation and data compression. The method may be part of, but is not limited to, a long term evolution (LTE) system that uses orthogonal frequency-division multiplexing (OFDM). The method may apply to other communications systems and other multiple access methods. The method provides low implementation complexity, no error propagation, random access for decompression, low distortion, and flexibility.

In 601, a signal over channels is received by a receiver.

In 603, channels are estimated (hereinafter "first channel estimates") by channel estimation (e.g. by a channel estimator 103 of FIG. 1). According to an embodiment of the present disclosure, the first channel estimates obtained by the channel estimator 103 may be represented as, but are not limited to, a vector with complex entries $h_l[k]$ for $k=0, \ldots, K-1$, where k is a frequency subcarrier index and l is an OFDM symbol index. The set of first channel estimates is denoted in OFDM symbol l by $H_l$. The first channel estimates may be stored with a finite precision format (e.g. fixed point with a given bit-width), but is not limited thereto.

In 605, a subset of the first channel estimates (hereinafter "decimated channel estimates") is selected by decimation (e.g. decimation 203 of FIG. 2). The decimated channel estimates may be based on a predetermined representation (e.g. fixed point with a given bit-width). For decimation 203, the choice of the decimated channel estimates, which will be used to predict channel estimates, enables the use of prediction methods with low implementation complexity while achieving small prediction error. In addition, the choice of decimated channel estimates allows random access during decompression, as described in more detail above with reference to FIG. 3. The subset selected by decimation 203 is represented in Equation (1) above.

In 607, second channel estimates (hereinafter "predicted channel estimates") of the first channel estimates are predicted using the decimated channel estimates by prediction (e.g. prediction 205 of FIG. 2). The method of predicting second channel estimates may be, but is not limited to, a linear interpolation or MMSE estimation. In an embodiment of the present disclosure where second channel estimates are predicted using linear interpolation as illustrated in FIG. 5 described above, predicted channel estimates are represented by Equation (2) above.

While the first channel estimates may be represented with a predetermined finite precision, the predicted channel estimates may be represented with higher precision than the first channel estimates, since they are not buffered.

In 609, channel estimation errors are computed by error computation (e.g. error computation 207 of FIG. 2) using the first channel estimates and the predicted channel estimates, where the channel estimation errors include the difference between the first channel estimates and the predicted channel estimates, but is not limited thereto. The difference between the first channel estimates and the predicted channel estimates is generated in accordance with Equation (3) above.

The set of errors may be denoted by $E_l$. These errors are buffered (e.g. buffering 211 of FIG. 1) as described below in a finite precision format, for example, fixed point representation with bit-width BitW. The errors may exceed the maximum representation range with bit-width BitW, in which case they may be rounded and saturated. Rounded and saturated errors are denoted by $\tilde{e}_l$, and the corresponding set $\tilde{E}_l$. After buffering of the sets $H_l^D$ and $\tilde{E}_l$, compression is completed.

Since second channel estimates are predicted using decimated channel estimates instead of reconstructed channel estimates, there is no error propagation. That is, if one predicted channel estimate includes an error, that error does not affect other predicted channel estimates. By varying the number of bits used for represent channel estimation errors, it is possible to trade off compression performance and decompression quality (rate-distortion tradeoff) as described in more detail above with reference to FIG. 3. This enables flexibility to suit various communication channels, modulation and coding rates, and signal propagation environments.

If the predicted channel estimates are generated for the first channel estimates not selected for the decimated channel estimates, the errors computed are small and have a smaller dynamic range as compared to the first channel estimates. As a result, the errors may be compressed using fewer bits for a given decompression approximation quality target as described in more detail above with reference to FIG. 3. This results in compression gains.

In 611, the channel estimation errors are compressed by compression (e.g. compression 209 of FIG. 2). The compression method may be, but is not limited to, encoding the channel estimation errors using a predetermined representation (e.g., fixed point with a given bit-width, quantization compression, lossless compression, or lossy compression).

In 613, the decimated channel estimates and the compressed channel estimation errors are buffered (e.g. buffering 211 of FIG. 2). As described in more detail above with reference to FIG. 3, the compressed channel estimation errors may be decompressed and used with the decimated channel estimates to approximate the first channel estimates.

Figure 7:
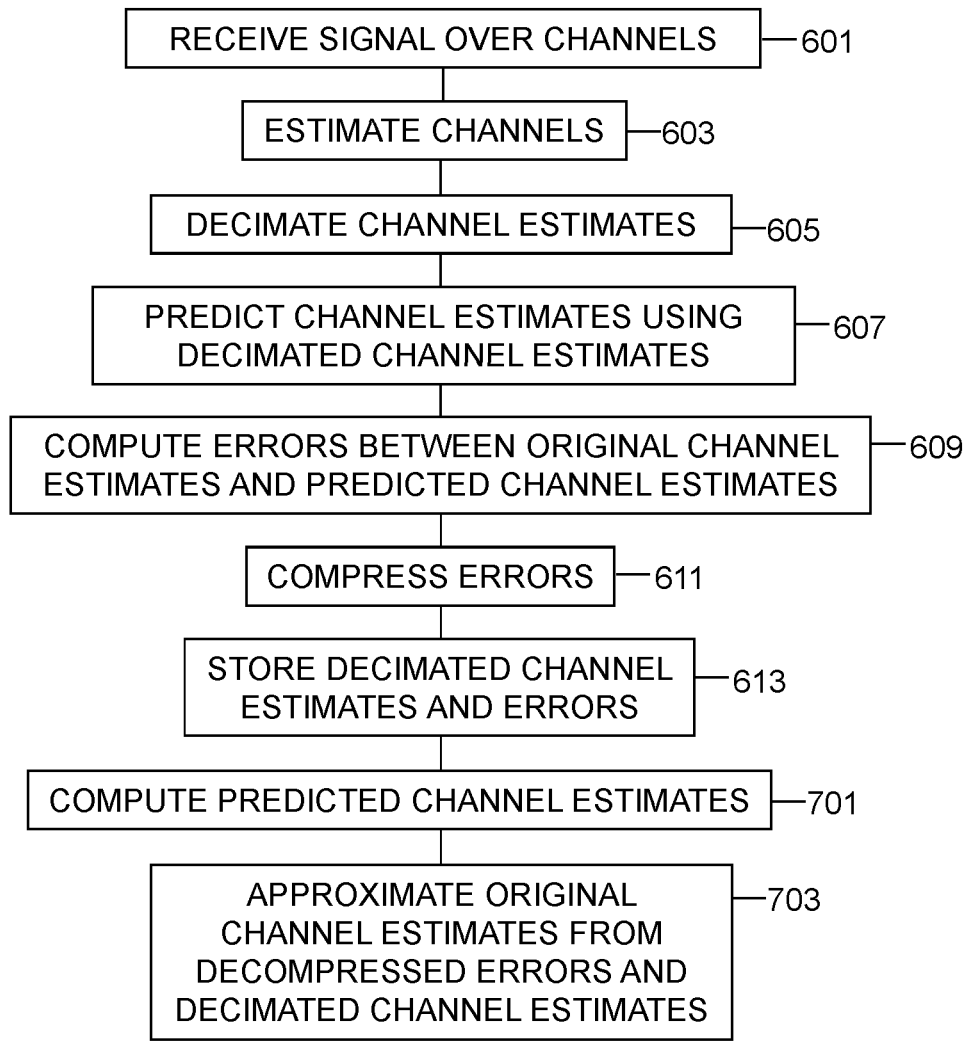
FIG. 7 is a flowchart of a method of receiving a signal over channels, compressing a channel estimation buffer via decimation, prediction, error compression, approximating original channel estimates from decimated channel estimates and compressed errors according to an embodiment of the present disclosure, and transmitting approximated channel estimates.

FIG. 7 is a flowchart of a method of receiving a signal over channels, compressing a channel estimation buffer via decimation, prediction, error compression, approximating original channel estimates from decimated channel estimates and compressed errors according to an embodiment of the present disclosure, and transmitting approximated channel estimates. FIG. 7 includes all of the operations of FIG. 6 plus computing predicted channel estimates, approximating original channel estimates, and transmitting the approximated channel estimates. The operations in FIG. 7 that are in common with the operations in FIG. 6 operate in the same manner. Thus, descriptions of the operations in FIG. 7 that are in common with operations in FIG. 6 are not repeated below.

Referring to FIG. 7, predicted channel estimates are computed from buffered decimated channel estimates and compressed channel estimation errors concerning a set of first channel estimates according to Equation (2) above by decompression (e.g. decompression 301 of FIG. 3) in 701. The channel estimates and compressed channel estimation errors may be received after being buffered (e.g. buffering 211 of FIG. 2).

In 703, the first channel estimates are approximated from the predicted channel estimates generated in 701 and the compressed channel estimation errors $\tilde{E}_l$ according to Equation (4) above, by approximation (i.e., approximation 303 of FIG. 3).

The result of 703 includes the approximate channel estimates and the decimated channel estimates $H_l^D$. However, $\tilde{h}_l[k]$ may differ from $h_l[k]$ due to rounding and saturation of the errors prior to storage. Distortion and compression performance may be traded off by varying the bit-width BitW.

In 705, the approximated first channel estimates are transmitted by a transmitter (e.g. transmitter 105 of FIG. 1).

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
 a receiver configured to receive a signal over channels;
 a channel estimator configured to estimate the channels as first channel estimates; and
 a processor configured to;
  select a predetermined subset of the first channels estimated as decimated channels;
  generate second channel estimates as predicted channel estimates of the first channel estimates using the decimated channels;
  compute channel estimation errors between the first channel estimates and the predicted channel estimates;
  compress the channel estimation errors; and
  buffer the decimated channel estimates and the compressed channel estimation errors.

2. The apparatus of claim 1, wherein the first channel estimates are represented as a vector spanning several dimensions including frequency, time, and space, wherein frequency includes subcarriers, wherein time includes symbol index, and wherein space includes transmit and receive antennas.

3. The apparatus of claim 1, wherein the decimated channel estimates are based on a predetermined representation including fixed point with a bit-width, pseudo floating point, and block pseudo floating point, and wherein the decimated channel estimates may be uniformly spaced or non-uniformly spaced.

4. The apparatus of claim 1, wherein the processor is further configured to generate second channel estimates as predicted channel estimates of the first channel estimates by linear interpolation, first order linear interpolation, $n^{th}$ order polynomial interpolation, minimum mean square error (MMSE) estimation, or extrapolation.

5. The apparatus of claim 1, wherein the predicted channel estimates are represented with a predetermined finite precision, where the predetermined finite precision may be higher than that of the original channel estimates.

6. The apparatus of claim 1, wherein the processor is further configured to compute channel estimation errors between the first channel estimates and the predicted channel estimates by determining differences between the first channel estimates and the predicted channel estimates.

7. The apparatus of claim 1, wherein the processor is further configured to compute channel estimation errors between the first channel estimates and the predicted channel estimates by rounding and saturating channel estimation errors represented in fixed point with a bit-width that exceeds a maximum representation range with the bit-width.

8. The apparatus of claim 1, wherein the processor is further configured to compress the channel estimation errors by encoding the channel estimation errors using a predetermined representation, wherein the predetermined representation includes fixed point with a bit-width, pseudo floating point with n bits for real and imaginary part mantissas and m bits for an exponent shared between the real and the imaginary mantissas, quantization compression, lossless compression, lossy compression.

9. The apparatus of claim 1, wherein the processor is further configured to buffer the decimated channel estimates and the compressed channel estimation errors by buffering the decimated channel estimates in a different representation than the original channel estimates by varying bit width or changing fixed/floating point to floating/fixed point, including block pseudo floating point (BPFLP), and the compressed channel estimates may be stored with a different representation depending on prediction error statistics, bit width, floating point, including BPFLP, or distance with respect to the decimated channel estimates.

10. The apparatus of claim 1, wherein the processor is further configured to:
 compute the predicted channel estimates; and
 approximate the first channel estimates using the predicted channel estimates and the compressed channel estimation errors.

11. A method, comprising:
 receiving a signal over channels by a receiver;
 estimating, by a channel estimator, the channels as a first channel estimate;
 compressing, by a processor, the channel estimates to reduce buffer size;
 selecting a predetermined subset of the estimated channels as decimated channels by the processor;
 generating second channel estimates as predicted channel estimates of the first channel estimates by the processor using the decimated channels;
 computing channel estimation errors between the first channel estimates and the predicted channel estimates by the processor;

compressing the channel estimation errors by the processor; and buffering the decimated channel estimates and the compressed channel estimation errors by the processor.

12. The method of claim 11, wherein the first channel estimates are represented as a vector spanning several dimensions including frequency, time, and space, wherein frequency includes subcarriers, wherein time includes symbol index, and wherein space includes transmit and receive antennas.

13. The method of claim 11, wherein the decimated channel estimates are based on a predetermined representation including fixed point with a bit-width, pseudo floating point, and block pseudo floating point, and wherein the decimated channel estimates may be uniformly spaced or non-uniformly spaced.

14. The method of claim 11, wherein generating the predicted channel estimates is comprised of generating the predicted channel estimates by linear interpolation, first order linear interpolation, $n^{th}$ order polynomial interpolation, minimum mean square error (MMSE) estimation, or extrapolation.

15. The method of claim 11, wherein the predicted channel estimates are represented with a predetermined finite precision, where the predetermined finite precision may be higher than that of the original channel estimates.

16. The method of claim 11, wherein computing channel estimation errors is comprised of computing channel estimation errors by determining differences between the original channel estimates and the predicted channel estimates.

17. The method of claim 11, wherein computing channel estimation errors is comprised of rounding and saturating channel estimation errors represented in fixed point with a bit-width that exceeds a maximum representation range with the bit-width.

18. A method, comprising:

receiving a signal over channels by a receiver;

estimating the channels as first channel estimates by a processor;

selecting a predetermined subset of the estimated channels as decimated channels by the processor;

generating second channel estimates as predicted channel estimates of the first channel estimates by the processor using the decimated channels;

computing channel estimation errors between the first channel estimates and the predicted channel estimates by the processor;

compressing the channel estimation errors by the processor;

buffering the decimated channel estimates and the compressed channel estimation errors by the processor;

computing the predicted channel estimates by the processor; and approximating the first channel estimates by the processor using the predicted channel estimates and the compressed channel estimation errors.

* * * * *